P. BRASHER.
REGISTERING DEVICE.
APPLICATION FILED JUNE 2, 1917.

1,262,742.

Patented Apr. 16, 1918.
2 SHEETS—SHEET 1.

INVENTOR
P. Brasher
BY
ATTORNEYS

WITNESSES

P. BRASHER.
REGISTERING DEVICE.
APPLICATION FILED JUNE 2, 1917.

1,262,742.

Patented Apr. 16, 1918.
2 SHEETS—SHEET 2.

| Blonde Good | Brunette Bad |
|---|---|
| 1. Positive, Aristocratic | 1. Negative |
| 3. Vigor, Vim, Virility | 3. Unvigorous, Inert, Frailty |
| 5. Forceful, Fighting Power, Strong | 5. Sensual, Luxurious, Incl. to Obesity |
| 7. Energetic, Strenuous, Diligent | 7. Unenergetic, Loves Ease-comfort, Lazy |
| 9. Quick thinking, Brilliant, Wit | 9. |
| 11. Presence of Mind, Keen, Alert | 11. Absent Minded |
| 13. Quick, Active, Agile | 13. Slow, Deliberate |
| 15. Loves activity, Brisk, Prompt | 15. Procrastination |
| 17. Bold, Courageous, Fearless | 17. Apprehensive, Timid, Fearful |
| 19. Self-confident, Decisive, Indep. | 19. Suspicious, Hesitating, Dependent |
| 21. Inventive, Creative, Original | 21. Imitative, Unoriginal |
| 23. Organizing, Executive, Leadership | 23. Stiff, Narrow, Obstinate |
| 25. Generalizing, L.B.Viewpoint, Versatile | 25. Stiff, Narrow, Obstinate |
| 27. Imaginative, Planning, Resourceful | 27. |
| 29. Constructive, Foresight, Promoting | 29. Destructive, Short-sighted, Petty |
| 31. Material, Commercial, Financial | 31. Too Refined |
| 33. Knowledge of Men Business, Mental Growth (Physical) | 33. |
| 35. Practical, Matter-of-Fact, Hard-Headed | 35. Impractical, Sentimental, Theoretical |
| 37. Optimistic, Hopeful, Cheerful | 37. Pessimistic, Worrisome, Morose |
| 39. Resilient, Rebound, Recuperative | 39. Melancholy |
| 41. Tractable, Adaptable, Supple | 41. Stubborn, Unadaptable, Stiff-necked |
| 43. Social, Good Mixer, Not Reserved | 43. Unsociable, Exclusive, Reserved |
| 45. Loves Crowds, Friendly, Genial | 45. Cruel, Unfriendly, Quick to take offence |
| 47. Aggressive, Driving, Dominating | 47. Unaggressive, Effeminate, Diffident |
| 49. Pushing, Unconventional, Daring | 49. Sensitive, Hyper Conscientious |
| 51. Responsive, Enthusiastic, Eager | 51. Unresponsive, Unenthusiastic, Indifferent |
| 53. Good Talker, Vivacious, Persuasive | 53. Poor Talker |
| 55. Frank, Candid, Outspoken | 55. Cunning, Scheming, Hypocritical |
| 57. Forgiving, quick to recover from anger | 57. Vengeful, Slow to recover from anger |
| 59. Non-Intense, Mild | 59. Vindictive, Hatred |
| 61. Initiative, Dynamic, Achievement | 61. Dreamy, Static, Indolgent |
| 63. Intellectual, Intelligent, Mental Aptitude | 63. Mentally Lazy, Opinionated, Bigoted |
| 65. Mechanical, Grasp of Laws of Motion | 65. |
| 67. Logical Reasoning, Reasonable | 67. Illogical, Unreasoning, Fault-finding |
| 69. Progressive, Reform, Not Conservative | 69. Lack of Progressive, Avaricious |
| 71. Generous, Hospitable Benevolence | 71. Stingy, Parsimonious, Economical |
| 73. Unselfish, Kind, Philanthropic | 73. Selfish, Calculating, Grasping |
| 75. Ambitious, Aspiring, Travel+Explor. | 75. Unambitious, Easy-going |
| 77. Musical, sense of Tune | 77. |
| 79. Rhythmic, sense of Time | 79. |
| 81. Perceptive, sense of Perception | 81. Unperceptive |
| 83. Observant, Color sense | 83. |
| 85. | 85. |
| 87. | 87. |
| 89. | 89. |
| 91. | 91. |
| 93. | 93. |
| 95. | 95. |
| 97. | 97. |

| Blonde Bad | Brunett Good |
|---|---|
| 2. Lack of Skill | 2. Skilful |
| 4. Unenduring | 4. Endurant, Reserve Power, Vital |
| 6. Incaution, Reckless, Foolhardy | 6. Caution, Prudent, Self Preservation |
| 8. Indiscreet, Approbative, Verbose | 8. Discreet, Secretive, Taciturn |
| 10. Speed Loving | 10. Deliberate, Leisurely |
| 12. Lack of ability to plod | 12. Plodding, Industrious, Educative |
| 14. | 16. Administering, Gov't |
| 16. Credulous, trusting | 16. Analytical, Critical, Research |
| 18. Neglect of Detail | 18. Specializing, Detail, Conscientious |
| 20. Cynical, Shallow, Impressionable | 20. Intense, Deep, Introspective |
| 22. Scatteration | 22. Concentrative, Serious, Memory |
| 24. Agnostic, Unidealistic, Irreverent | 24. Spiritual, Idealistic, Religious |
| 26. Materialistic, Appetites+Passions | 26. High Principles, Ethical, Moral |
| 28. Loves applause | 28. Faith, Mysticism |
| 30. Thoughtlessness, Lack of Reflection | 30. Meditative, Thoughtful, Reflective |
| 32. Impatient, Undomestic, Egotistic | 32. Patient, Domestic, Teachable |
| 34. Domineering, Uncontrolled, Not Obedient | 34. Submissive, Self-control, Obedient |
| 36. Radical, Revolutionary, Impetuous | 36. Conservative, Convention, Dignified |
| 38. Vain, Lack of Self-control, Pugnacious | 38. Reserved, Self-Respecting, Unaggressive |
| 40. Inconstant, Not consistent, Changeable | 40. Constant, Consistent, Unchanging |
| 42. Unstable, Rebellious, Undependable | 42. Steadfast, Loyal, Dependable |
| 44. Extremes, Overwork, Fanatic | 44. Moderate, Sane, Common Sense |
| 46. Drunkenness, Tempt to Graft, Irresponsibility | 46. Moral courage, Honest, Honorable |
| 48. Nervous, Emotional, Restless | 48. Calm, Poise, Equable |
| 50. Quick to anger, Irritable, Quick temper | 50. Good natured, Unirritable, Suave |
| 52. Tactless, Caustic, Argumentative | 52. Tactful, Diplomatic, Agreeable, Willingness to Agree |
| 54. Impulsive, Variety-loving, Spasmodic | 54. Perserverant, Persistent, Continuity |
| 56. Yielding | 56. Firm, Determined, Resolute |
| 58. Cold, Unaffectionate, Indifferent | 58. Warm, Affectionate, Desires Affection |
| 60. Ruthless, Hard-hearted, Defiant | 60. Loves Nature, Tender-Hearted, Amorous |
| 62. Careless, Violent, Scatter-brained | 62. Careful, Painstaking, Thorough |
| 64. Extravagant, Speculative | 64. Economical, Aquisitive |
| 66. Unsystematic | 66. Mathematical, Accurate, Systematic |
| 68. Lack of Judgment, Overbearing Injud. | 68. Judicial, Just, Judicious |
| 70. | 70. Professional, Philosophic |
| 72. | 72. Humor |
| 74. | 74. Intuitive, Visionary |
| 76. Unsympathetic | 76. Sympathetic, Democratic |
| 78. Combative, Truculent, Thick-skinned | 78. Artistic, Poetical, Fine-fibred |
| 80. Coarseness, Primitive, Crudeness | 80. Refinement, Finenessof Adj. Delicacy |
| 82. Disinclination to Study | 82. Scientific, Literary, Studious |
| 84. Undiscerning | 84. Discerning, Discriminative |
| 86. | 86. |
| 88. | 88. |
| 90. | 90. |
| 92. | 92. |
| 94. | 94. |
| 96. | 96. |
| 98. | 98. |
| 100. | 100. |

WITNESSES

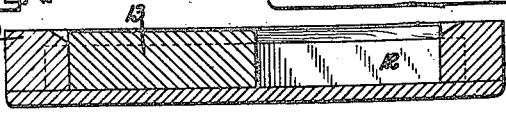

INVENTOR
P. Brasher
BY
ATTORNEYS

UNITED STATES PATENT OFFICE.

PHILIP BRASHER, OF NEW HAVEN, CONNECTICUT.

REGISTERING DEVICE.

1,262,742.　　　　Specification of Letters Patent.　　Patented Apr. 16, 1918.

Application filed June 2, 1917.　Serial No. 172,437.

*To all whom it may concern:*

Be it known that I, PHILIP BRASHER, a citizen of the United States, and a resident of New Haven, in the county of New Haven and State of Connecticut, have invented a new and Improved Registering Device, of which the following is a full, clear, and exact description.

The object of the invention is to provide a new and improved registering device more especially designed to mechanically assist an analyst in determining the qualities of any individual by certain evident, visible, physical characteristics.

In order to accomplish the desired result, use is made of guideways arranged one alongside the other, slides one for each guideway and adapted to be shifted therein, each slide having a positive and a negative set of indicating characters representing mental qualities, the slides being normally in inactive position in one portion of the guideways and being adapted to be shifted in the guideway into active or reading position. Use is also made of a chart divided into two color groups, each group being subdivided into a positive and a negative division, each division having a column of numerals corresponding to numerals on the slides, and with each chart numeral are associated the names of mental qualities, each name being represented by a letter of the alphabet on the said slides.

A practical embodiment of the invention is represented in the accompanying drawings forming a part of this specification, in which similar characters of reference indicate corresponding parts in all the views.

Figure 1 is a plan view of the registering device with the cover removed;

Fig. 2 is an enlarged sectional side elevation of the same on the line 2—2 of Fig. 1 and with the cover in position;

Fig. 3 is an inverted plan view of the cover; and

Fig. 4 is a cross section of the registering device on the line 4—4 of Fig. 1 and with the cover omitted.

The invention is based on fundamental physical variables employed in analyzing the character of an individual by observation of the color, form, size, structure, texture, consistency and proportion of the individual. Individuals are classified or judged under two color groups, blonde or brunette, each group being subdivided as positive (good) and negative (bad).

Color is judged by the color of the hair, eyes and skin and is considered as blonde or brunette. When the color is neither blonde nor brunette then it is considered medium and excluded from the calculation as not being definite enough to affect the result.

Form is shown by the forehead, eyes, nose, mouth and chin of an individual as seen in profile, and each of these features may be convex or concave. If observation shows them to be neither one nor the other then they are plane and considered all balanced so that they can be excluded from the calculation. This same principle of balance is carried throughout the system and so no further mention of it is deemed necessary.

Size is large or small.

Structure is judged by the size and shape of the head, body and hands.

Texture is shown by the hair, features and skin, and is either fine or coarse.

Consistency as disclosed by a handshake is either hard, elastic or soft.

Flexibility is rigid or pliable.

Proportion is shown by the ratio of the size of the head compared with the size of the body, the size and shape of one feature as compared with another, and the sections and divisions of the head.

Each one of these physical variables indicates the possession of one or more qualities or characteristics of mind. For instance, large size indicates slow thought, mildness, deliberateness, power, momentum, perseverance, leisureliness, gentleness. On the other hand, convex forehead indicates quick thought, active and accurate perception, practicality, alertness. It will readily be seen then that an individual of large size and with a convex forehead could not be judged to be slow of thought nor could it be considered to be quick thinking on the basis of these two variables alone. If this were all that were known of the individual it would have to be said simply that he can think fairly quickly, but the approximately correct solution can only be attained by considering all the variables, adding all the positive indications of a characteristic and comparing these with the sum of all the negative indications of the same, and the resultant ratio will be the approximate index of the possession of the characteristic in question. The present method of arriving at this result is to rely upon memory or else to make exhaustive notes and calculations on paper, and in order to enable an analyst to arrive at the result use is made of the registering device presently described in detail.

The registering device is preferably mounted on a box body 10 provided with a suitable removable cover 11. In the box body 10 are arranged transverse guideways 12 in each of which is slidably mounted a slide 13 provided on its face with a set of positive indicating characters 14 and a set of negative indicating characters 15. Each of the indicating characters 14 and 15 consists of a numeral and one, two or three letters of the alphabet associated with each numeral, the letters of the alphabet being preferably A, B and C. Each guideway 12 is approximately twice the length of a slide 13 so that each slide can be shifted either into rearmost inactive position or into forward active or reading position. The top of the rear side of the box body 10 is provided with headings 16, each embracing, at least, two adjacent guideways 12, as will be readily understood by reference to Fig. 1. The headings 16 indicate the fundamental physical variables and their subdivisions. On the top of the front piece of the box body 10 are arranged indicating characters 17, one for each guideway 12, and each formed of one or more letters of the alphabet. Each character 17 represents subdivisions of the variables 16 and their subdivisions. By reference to Fig. 1, it will be noticed that the first variable division marked "Size" embraces two guideways 12, the first guideway having the indicating character "L" which stands for "large" and the other guideway having the indicating character "S" which stands for "small". The heading "Consistency" embraces three guideways 12, of which the first one is marked by the indicating characters "H I S" meaning "hard consistency"; the next one is marked "E I S" meaning "elastic consistency", and the third one is marked "S I S" meaning "soft consistency".

In order to enable the analyst to quickly read the qualities of an individual under examination after the slides disclosing the corresponding visible physical characteristics have been moved into forward position, use is made of a chart 20, preferably mounted on the under side of the cover 11, as plainly shown in Fig. 3. This chart is divided into two color groups, "Blonde" and "Brunette", each group being subdivided into positive divisions "Blonde good", "Brunette good" and negative divisions "Blonde bad", "Brunette bad", as plainly indicated in Fig. 3. Each division is provided with a column of numerals corresponding to the numerals of the indicating characters 14 and 15 on the slides 13, and with each chart numeral are associated the names of mental qualities, each name being represented by a letter of the alphabet associated with the numerals on the characters 14 and 15 of the slides 13. Thus the first name associated with a chart numeral is represented by the letter A on the slide 13, the second name associated with the same numeral is represented by the letter B and the third name associated with the same numeral is indicated by the letter C of a slide 13. The numerals for "Blonde good" and for "Brunette bad" divisions are preferably uneven numbers, while the numbers for the "Blonde bad" and "Brunette good" divisions are even numbers, as will be readily understood by reference to Fig. 3. The numerals and letters of the indicating characters 14 and 15 are preferably printed in two colors, red and black, to facilitate the reading and to permit the use of the same odd numerals for both divisions "Blonde good" and "Brunette bad", and the same even numerals for both divisions "Blonde bad" and "Brunette good". "Blonde good" qualities are represented by odd numerals in red, followed by letters printed in red and are only found in the positive portion of the slide. "Brunette bad" qualities are represented by the same odd numbers printed in black followed by letters printed in black, and are only found on the negative portion of the slide. "Brunette good" qualities are represented by even numbers followed by letters printed in black on the positive portion of the slide, and "Blonde bad" qualities are represented by the same even numbers followed by letters printed in red and are on the negative portion of the slide.

It will be noticed that on the first slide in the guideway 12, under the heading "Size" and the subdivision "L" appears the character "5ABC" of the positive characters 14. Turning to the chart shown in Fig. 3, we find under "5" in the column "Blonde good" the names "Forcible", "Fighting power", "Strong", represented by the letters A, B and C associated with the numeral "5" on the said first slide 13. The first indicating character of the negative characters 15 on the first slide 13 is "4A" and turning to the chart we find under "Blonde bad" (negative), opposite the numeral "4", the name "Unenduring". Considering the second slide 13, under the heading "Size" we find the first indicating character of the positive characters 14 is "9A" and consulting the chart we find in the division "Blonde good" that it represents the mental quality "quick thinking", and on the next line we find "13ABC" which is disclosed by the chart, under the same division, as "quick", "active", "agile". The first indicating character on the negative portion of this second slide is "32C" and we find under the negative division marked "Blonde good" that it represents the mental quality "egotistic". By reference to the chart shown in Fig. 3 it will be noticed that the positive and negative mental qualities associated with the same numerals are the antithesis of one relative to the other. Thus "3ABC" in the division "Blonde good" stand for the positive mental qualities "vigor", "vim", and "virility", and under "3ABC" in the division "Brunette bad" we find "unvigorous", "inert", and "frailty".

In order to use the device all the slides are moved to a rearmost position, then one slide under the heading "Size" is pushed forward according to the characteristic of the individual, that is, whether the same is large or small, indicated by the letters "L" and "S"; one or two slides under "Consistency" are moved forward according to the observation of the individual; one slide under "Flexibility" is moved forward for the same reason; one or two slides under "Structure"; one or two slides under "Face section"; one under "Texture", etc., are moved forward according to the observed physical characteristics of the individual. This operation is continued for the corresponding slides under the several headings. Then they are read, and the number of times each number appears positively is checked against the number of times it appears negatively, plus or minor 1 for "color" wherever color is a factor. For instance, if "7A", which is "Energetic", appears four times positively and once negatively, that mental characteristic will be pronounced in the individual examined at the time. This operation is repeated until all the figures and letters have been accounted for.

In order to show exactly the method of use, it will be well to consider an individual case of character analysis, utilizing the register. The subject is brought in and introduced to the analyst, who then takes a "data sheet" and fills it out for reference. It is easier to simply move the slides in the register without making out a data sheet if the purpose of the analysis is not important, but usually it is safer to fill out a data sheet for reference if needed. This takes a minute or two. He finds that the subject is "blonde" in color, "large" in size, "elastic" in consistency, "elastic" in flexibility. Also that he is "motive, mental, vital" in structure, that the "lip section" predominates in the face, that he is "fine" in texture. The forehead is slightly "convex", the eyes are slightly "convex", the nose is "plane", the mouth is slightly "convex" and the chin is "plane". The head is "long, high +, wide and square". The "middle division" predominates, so does the "temporal section". The proportions of the body are "feminine". The forehead is very slightly "prominent below" is "high wide" and "square". The hand is "pink" and "square". The fingers are "short", "square" and "knotty". The finger tips are "square". The thumb is "large long" "square", "low set" and "flexible". The nails are "first class".

We are now ready to use the calculator. See that all slides are at the top end of the slots. Then move the one indicating large size (symbol "L") to the bottom of its slot. Do the same with "elastic consistency" (symbol EIS). Note that there is no slide for "elastic flexibility" as it is practically the same as "elastic consistency", and then in turn move down the following slides as indicated by the symbols—MOT=motive structure; LS=lip section; FXT=fine texture; FX=convex forehead; EX=convex eye; MX=convex mouth; DH=long head; HH=high head; WH=wide head; QH= square head; MD=middle division; T= temporal section; MBF=forehead prominent below; WLF=wide forehead; W= feminine body proportions; QA=square hand; KA=pink in color; SI=short fingers; KI=knotty fingers; QE=square finger ends; QU=square thumb; LSU=low set; GU=large; AAL=first class nails.

We are now ready to sum up the result. Taking the checking sheet it will be noted that the first slide "L" contains the following numbers and letters positively: 5ABC; 59A; 10A; 32A; 36C; 48AB; 54A. Also the following negatively: 4A; 44B; 3B; 13AB; 51C. A mark is made for each of these in its proper place on the checking sheet. Each slide is handled in turn in the same way, and when the last slide is finished the resulting characteristics can be read right from the checking sheet or in connection with the index. It will be remembered that as the subject is decidedly blonde in color, one unit should be added to certain "blonde good" characteristics, and one unit subtracted from certain "brunette good" characteristics. In striving for a result it must be remembered that each individual is psychically a mass of contradiction, that this is reflected physically and it is only by careful separation and accounting of these various evidences of contradictory characteristics, that an approximately correct result can be arrived at. A man cannot be put on the hay scales and his sense of honesty weighed nor can we say that a man has 2 inches or 2 ounces of common sense. But if after a careful study of his physical qualities we see that he has 5 indications of honesty and only 2 of a tendency toward a lack of it, it has been proven that the individual in question is normally honest.

And so the analysis just made gives the following results: (For convenience, those characteristics in which the indications are balanced are omitted entirely, because even if possessed, they will be so slight as to be practically negligible, and the others will be named and followed by the number of indications with a plus and minus sign, showing the number of indications positively, and then those negatively):

Positive +3—2
Aristocratic +1—0
Vigor +3—1
Vim +2—3
Virility +2—0
Forceful +3—1
Fighting power +2—0
(Strong +2—2) balanced
  Should be omitted
Energetic +6—1
Strenuous +1—2
Diligent +0—1
Quick thinking +4—0
Brilliant +1—0
Wit +1—0
Presence of mind +2—1
Keen +5—0
Alert +2—0
Quick +1—2
Active +4—1
Agile +4—0
Loves activity +4—0
Brisk +2—0
Prompt +1—1
Bold +1—0
Courageous +3—0
Fearless +2—3
Self-confident +1—0
Decisive +5—1
Independent +1—0
Inventive +4—1
Original +2—1
Organizing +2—0
Executive +1—0
Leadership +3—0
Generalizing +2—0
Broad viewpoint +4—0
Versatile +2—0
Imaginative +3—0
Planning +2—0
Resourceful +1—0
Constructive +4—1
Foresight +2—0
Promoting +2—0
Material +5—0
Commercial +2—0
Financial +4—0
Knowledge of men +2—0
Knowledge of business +1—0
Men. and phys. growth +2—0
Practical +9—0
Matter-of-fact +5—2
Hard-headed +4—1
Optimistic +3—1
Hopeful +1—0
Cheerful +3—0
Resilient +2—0
Rebound +2—1
Recuperative +2—0
Adaptable +2—0
Social +3—0
Loves crowds +2—1
Friendly +1—0
Genial +2—0
Aggressive +3—1
Dominating +3—1
Unconventional +1—0
Daring +1—0
Responsive +3—0
Enthusiastic +5—0
Eager +2—1
Good talker +2—0
Vivacious +2—0
Persuasive +2—0
Frank +2—0
Candid +2—0
Outspoken +2—0
Forgiving +1—0
Quick to recover from anger +1—0
Non-intense +1—0
Mild +0—1
Initiative +4—0
Dynamic +—0
Achievement +—0

Intellectual +2—0
Intelligent +2—0
Mental apt. +4—0
Mechanical +3—0
Logical +2—1
Reasoning +3—0
Reasonable +2—0
Progressive +3—0
Reform +1—0
Not conservative +2—1
Generous +4—0
Hospitable +1—0
Benevolent +1—0
Philanthropic +0—1
Ambitious +2—0
Aspiring +2—0
Travel and explor. +1—0
Musical +1—0
Perceptive +1—0
Endurant +2—4
Reserve power +1—0
Vital +2—0
Caution +1—2
Prudent +0—2
Discreet +0—1
Secretive +0—2
Taciturn +1—2
Deliberate +1—0
Leisurely +0—2
Plodding +0—1
Industrious +2—0
Administering +3—0
Government +1—0
Analytical +1—3
Critical +0—1
Research +2—0
Detail +1—2
Conscientious +2—0
Deep +1—2
Introspective +0—1
Memory +1—0
Spiritual +0—2
Intense +2—1
Idealistic +0—2
Ethical +0—1
Moral +0—1
Faith +0—2
Thoughtful +1—2
Reflective +1—2
Patient +3—4
Domestic +0—1
Teachable +1—2
Submissive +0—2
Self-control +0—1
Obedient +0—1
Dignified +2—4
Reserved +0—1
Self-respecting +0—2
Unaggressive +0—1
Constant +0—1
Unchanging +0—1
Steadfast +0—1
Loyal +0—1
Dependable +0—2
{Moderate (extremes) +0—3
 Sane (overwork) +0—3
 Common sense +0—1}
Moral courage +0—1
Honest +2—1
Calm +2—4
Poise +1—2
Equable +0—1
Unirritable +1—2
Suave +0—1
Tactful +0—1
Diplomatic +1—3
Willing to agree +0—1
Perseverant +1—2
Persistent +3—1
Continuity +0—1
Determined +1—0
Warm +2—1
Affectionate +4—1
Desires affection +0—1
Tender-hearted +2—0

Careful +0—1
Painstaking +1—2
Economical +0—1
Mathematical +2—0
Accurate +2—0
Systematic +4—1
Judicious +4—2
Philosophic +1—0
Humor +2—0
Intuitive +2—0
Sympathetic +4—2
Artistic +2—1
Poetical +1—2
Refinement +1—0
Fineness of adjust. +1—0
Delicacy +1—0
Scientific +5—0
Studious +1—2

NOTE.—Where the algebraic sum is a minus quantity a corresponding lack of quality is understood.

The foregoing is a complete analysis. It is not always necessary to go into such detail and the same method can be used when it is desired to determine only one or two mental characteristics out of the two hundred shown. A registering device for determining mental characteristics of individuals for the special classes of work, say, clerical, skilled mechanics, and laborers, can be constructed in an exceedingly simplified form by the omission of a large number of slides which have no bearing on the requirements in the vocations mentioned.

Having thus described my invention, I claim as new and desire to secure by Letters Patent:—

1. In a registering device, a series of guideways arranged one alongside the other, slides one for each guideway and adapted to be shifted therein, each slide having a positive and a negative set of indicating characters representing mental qualities, the slides being normally in inactive position in one end of the guideways and being adapted to be shifted in the guideway into active reading position.

2. In a registering device, guideways, sets of slides each mounted to slide in a guideway, each slide being provided on its face with a positive and a negative set of indicating characters representing personal characteristics or quality of the mind, headings on one end of the said guideways and indicating divisions of fundamental physical variables, and indicating characters on the other ends of the guideways indicating subdivisions of the said variables.

3. In a registering device, guideways, sets of slides each mounted to slide in a guideway, each slide being provided on its face with a positive and a negative set of indicating characters representing personal characteristics or quality of the mind, headings on the end of the said guideways and indicating divisions of fundamental physical variables, indicating characters on the other ends of the guideways indicating subdivisions of the said variables, each guideway having a heading denoting fundamental physical variables, and indicating characters at the foot of the guideways to indicate subdivisions of the said variables.

4. In a registering device, a box body, a cover for the same, guideways arranged in the said box body one alongside the other and ranging in a transverse direction, slides one in each guideway and shiftable therein from rear normal inactive position into forward active position, each slide being provided on its face with a set of positive and a set of negative characters of numerals and letters of the alphabet and representing mental qualities, headings marked on the top of the rear side of the box body and indicating fundamental physical variables, each variable heading embracing at least two guideways, and indicating characters at the foot of each guideway and representing subdivisions of the said variables.

5. In a registering device, a box body, a cover for the same, guideways arranged in the said box body one alongside the other and ranging in a transverse direction, slides one in each guideway and shiftable therein from rear normal inactive position into forward active position, each slide being provided on its face with a set of positive and a set of negative characters of numerals and letters of the alphabet and representing mental qualities, headings marked on the top of the rear side of the box body and indicating fundamental physical variables, each variable heading embracing at least two guideways, indicating characters at the foot of each guideway and representing subdivisions of the said variables, and a chart on the under side of the said cover and divided into two color groups, each group being subdivided into a positive and a negative division, each division having a column of numerals corresponding to the numerals on the slides, and with each chart numeral are associated names of mental qualities, each name being represented by a letter of the alphabet on the slides.

PHILIP BRASHER.